(12) United States Patent
Sitaram et al.

(10) Patent No.: US 9,483,510 B2
(45) Date of Patent: Nov. 1, 2016

(54) CORRELATING DATABASE AND STORAGE PERFORMANCE VIEWS

(71) Applicant: NetApp, Inc., Sunnyvale, CA (US)

(72) Inventors: Anand Sitaram, Bangalore (IN); Sachin Maheshwari, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 187 days.

(21) Appl. No.: 14/255,818

(22) Filed: Apr. 17, 2014

(65) Prior Publication Data
US 2015/0302034 A1    Oct. 22, 2015

(51) Int. Cl.
*G06T 7/00* (2006.01)
*G06F 17/30* (2006.01)

(52) U.S. Cl.
CPC ....... *G06F 17/30312* (2013.01); *G06F 17/302* (2013.01); *G06F 17/30864* (2013.01)

(58) Field of Classification Search
USPC ................................ 707/769, 713; 710/8, 12
See application file for complete search history.

(56) References Cited

U.S. PATENT DOCUMENTS

| | | | |
|---|---|---|---|
| 6,035,306 A * | 3/2000 | Lowenthal | G06F 11/32 |
| 6,611,867 B1 * | 8/2003 | Bowman-Amuah | H04L 12/2602 |
| | | | 709/218 |
| 6,845,344 B1 * | 1/2005 | Lally | G06F 11/321 |
| | | | 702/122 |
| 2004/0193827 A1 * | 9/2004 | Mogi | G06F 9/5083 |
| | | | 711/170 |
| 2008/0243866 A1 * | 10/2008 | Pandey | G06F 17/30067 |
| 2010/0262633 A1 * | 10/2010 | Bhattacharjee | G06F 17/30312 |
| | | | 707/812 |
| 2012/0047287 A1 * | 2/2012 | Chiu | G06F 3/0605 |
| | | | 710/8 |

* cited by examiner

Primary Examiner — Hung T Vy
(74) Attorney, Agent, or Firm — Klein, O'Neill & Singh, LLP

(57) ABSTRACT

Technology is disclosed for providing access to operation performance of various storage mediums in a distributed storage system, which store and host data associated with a database ("the technology"). The technology can identify the storage mediums storing data associated with a particular database, gather data associated with performance of each of the identified storage mediums storing data associated with the particular database, and generate performance statistics associated with each of the identified storage mediums utilizing the gathered data and provide the generated statistics as a performance overview of storage associated with the particular database.

17 Claims, 6 Drawing Sheets

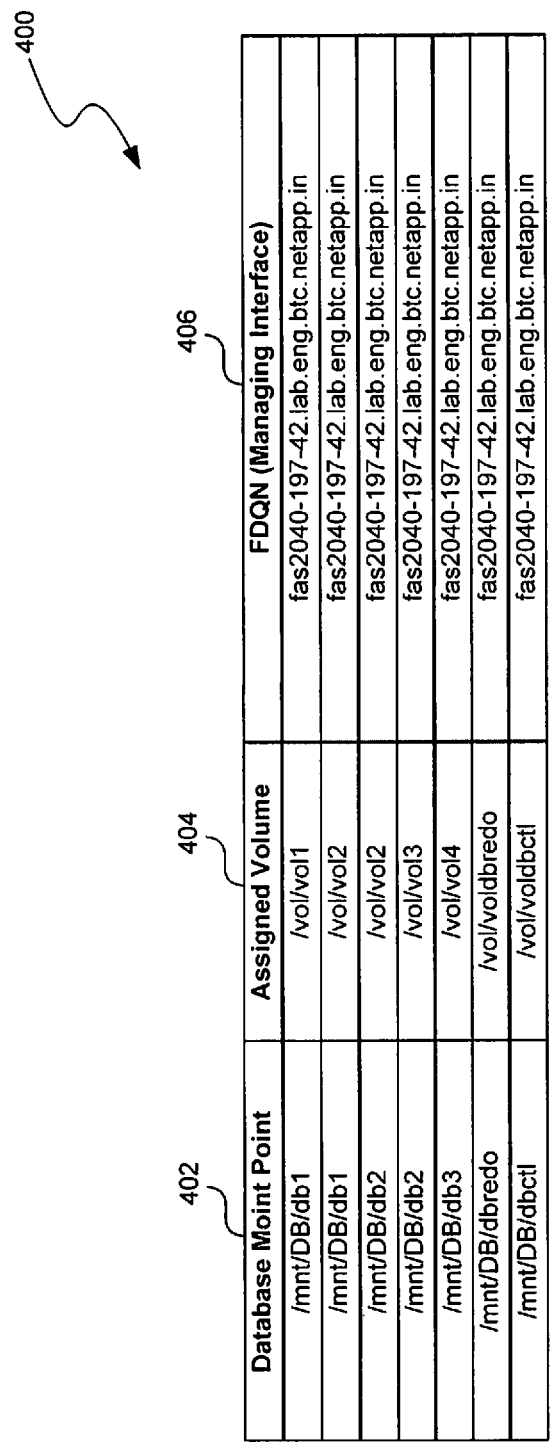

| Database Moint Point | Assigned Volume | FDQN (Managing Interface) |
|---|---|---|
| /mnt/DB/db1 | /vol/vol1 | fas2040-197-42.lab.eng.btc.netapp.in |
| /mnt/DB/db1 | /vol/vol2 | fas2040-197-42.lab.eng.btc.netapp.in |
| /mnt/DB/db2 | /vol/vol2 | fas2040-197-42.lab.eng.btc.netapp.in |
| /mnt/DB/db2 | /vol/vol3 | fas2040-197-42.lab.eng.btc.netapp.in |
| /mnt/DB/db3 | /vol/vol4 | fas2040-197-42.lab.eng.btc.netapp.in |
| /mnt/DB/dbredo | /vol/voldbredo | fas2040-197-42.lab.eng.btc.netapp.in |
| /mnt/DB/dbctl | /vol/voldbctl | fas2040-197-42.lab.eng.btc.netapp.in |

*FIG. 4*

CORRELATING DATABASE AND STORAGE PERFORMANCE VIEWS

TECHNICAL FIELD

Various of the disclosed embodiments relate to providing access to operation performance of various storage mediums in a distributed storage system.

BACKGROUND

Many commercial applications, including financial management systems, payroll applications, customer relationship management systems, etc., utilize one or more database applications, e.g., Oracle Enterprise®, DB2®, MySQL® and SQL® Server, etc., to store and manage data in distributed storage systems. Enterprises worldwide spend billions of dollars annually in managing and administering these database applications and underlying storage infrastructure provided by the distributed storage systems. Database administration is the process of establishing computerized databases, and ensuring their integrity, recoverability, security, availability, reliability, scalability and performance.

Database administrators ("DBAs") work with database management system software to organize, store and retrieve data. One of the primary responsibilities of a DBA is fine tuning performance of databases for high throughput/availability for enterprise applications. A DBA can fine tune various database parameters to improve performance of a particular database. However, a DBA has limited means to determine whether an observed performance bottleneck is due to the particular database's internals/layout or due to the underlying infrastructure, specifically the storage infrastructure that is hosting the data associated with the particular database.

Accordingly, known techniques for determining the performance of storage infrastructure associated with a database are limited in their capabilities and suffer from at least the above constraints and deficiencies.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 4 is a mapping table illustrating the mapping between the various databases, the mount points assigned to the databases, the storage volume associated with the mount points, and a fully qualified domain name address of the storage servers.

DETAILED DESCRIPTION

Figure 1:
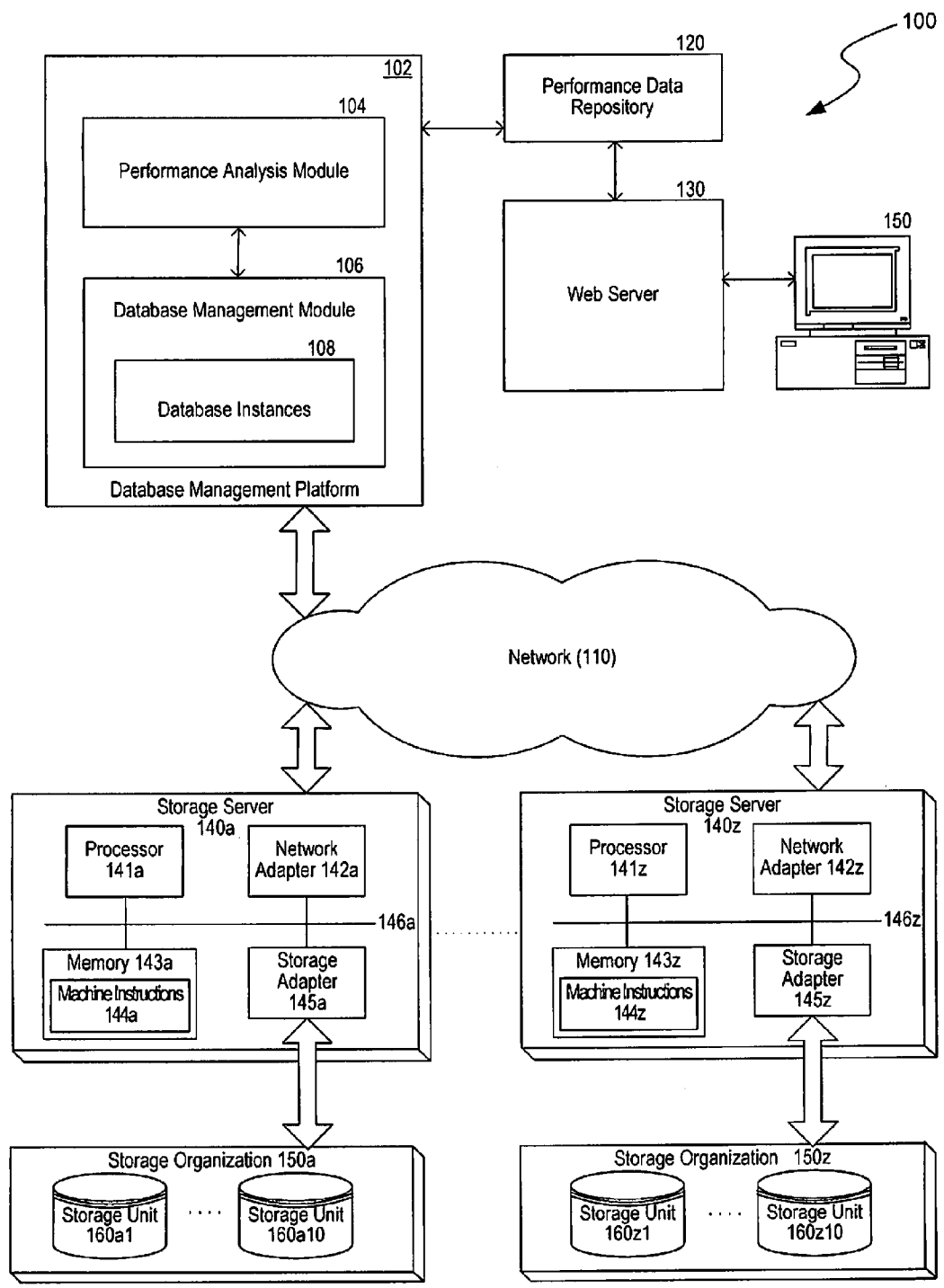
FIG. 1 is a block diagram illustrating a distributed storage environment in which the technology can operate in various embodiments.

Technology is disclosed for correlating database and storage performance views, e.g., by providing access to operation performance of various storage media and devices in a distributed storage system, which store and host data associated with a database ("the technology"). In various embodiments, to provide the operation performance, the technology identifies the storage volumes that are accessible through various storage servers (e.g., "storage node" or "storage controller") of the distributed storage system. A storage volume is a logical storage entity providing a logically contiguous portion of storage within a physical storage medium or device, e.g., hard disk drive, solid state device, etc. The storage volume can be utilized to store data associated with one or more databases that employ the distributed storage system to store their data.

To determine the operation performance for a particular database, the technology identifies a subset of storage volumes of the accessible storage volumes that presently store data associated with the particular database. The technology identifies the subset of storage volumes using mapping information that maps the particular database to one or more storage nodes providing access to the subset of storage volumes storing data associated with the particular database. The mapping information further includes identification information of the specific storage volume of the one or more storage volumes that are accessible through the particular storage node which has been assigned to store data associated with the particular database.

For each of the storage volumes of the subset of storage volumes, the technology gathers the data associated with performance of each storage volume from the storage node providing accessing to it. The storage node monitors and stores data for various performance parameters for the storage volumes to which it provides access. The performance parameters include a delay associated with servicing a data read access request, a delay associated with servicing a data write request, a delay associated with servicing a data modification request, a total number of access requests performed within a particular time period, etc.

The technology generates various performance statistics for each of the storage volumes utilizing the gathered performance parameter data. The generated performance statistics can include a read latency of a storage volume at a particular time computed as a function of the delay associated with servicing a data read access request at the particular time. Further, the generated performance statistics can include a write latency of the particular storage volume at the particular time measured as a function of a delay associated with servicing a data write access request at the particular time. Other generated statistics can include an average latency of the particular storage volume at the particular time measured as a function of the generated read latency and write latency at the particular time.

The technology provides the generated statistics as a performance overview of storage volumes associated with the particular database. In some embodiments, the technology provides the generated statistics in the form of line charts for each particular storage volume. Further, when the database spans across multiple storage volumes, the technology sorts the charts based upon the generated statistics, e.g., average latency, read latency, write latency, etc., and provides a subset of top volumes by performance. The technology further provides the various generated statistics in terms of performance of a particular volume, where the performance of each of the database stored in the particular volume is provided as a line chart.

Several embodiments of the disclosed technology are described in more detail in reference to the Figures. Turning now to the Figures, FIG. 1 is a block diagram illustrating a distributed storage environment 100 in which the technology can operate in various embodiments. It should be noted that the described technology can be implemented in other storage environments and the technology's operation should not be considered limited to the distributed storage environment 100 illustrated in FIG. 1.

The distributed storage environment 100 includes a database management platform 102, one or more storage servers 140a-140z (also referred to as "storage node" or "storage controller"), storage organizations 150a-150z with storage units 160a1-160z10 which are managed by the one or more storage servers 140a-140z, a network 110 providing connectivity between the various storage servers 140a-140z and the database management platform 102, a performance data repository 120 to store data related to the performance of various storage mediums 150a-150z, and a web server 130 to provide access to the stored performance data in the performance data repository 120 as web content to a client system 150.

The following discussion provides a description of the storage server 140a and its various sub-components, and the storage organization 150a and its various sub-components. It should be noted that the description of the storage server 140a and its various sub-components, and the storage organization 150a and its various sub-components are equally applicable to other storage servers 140z and storage organizations 150z, respectively, in the distributed storage environment 100.

In some embodiments, the storage server 140a can be a file-level server, e.g., a data server in a network-attached storage ("NAS") environment. In embodiments, a storage server 140a include a network module (e.g., "N-module") and a disk module (e.g., "D-module") (not shown), which communicate with each other and/or with other storage servers 140a over an external interconnect. The N-module acts as a front-end of the storage server 140a, exporting services to clients; and the D-module acts as the back-end, managing the underlying storage 150a of the storage server 140a.

The N-module and D-module can be contained in separate housings and communicate with each other via network connections. Thus, the N-module and the D-module enable a storage server to be physically separated and distributed across a network 110. In some embodiments, a storage server 140a can include multiple N-modules and D-modules, each of the N-modules corresponding to one or more D-modules, and each of the D-modules corresponding to one or more N-modules. In some embodiments, the N-module ("a management interface") and D-module ("a data interface") are each assigned a fully qualified domain name ("FQDN") or an internet protocol ("IP") address, which can be utilized to identify the respective module and communicate with the identified module through the network 110.

In some embodiments, the storage server 140a includes one or more processors 141a and memory 143a connected via an interconnect 146a. The interconnect 146a is an abstraction that represents any one or more separate physical buses, point-to-point connections, or both connected by appropriate bridges, adapters, or controllers. The interconnect 146a, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 141a may include central processing units (CPUs) of the storage server 140a and, thus, control the overall operation of the storage server 140. In certain embodiments, the processor(s) 141a accomplish this by executing software or firmware stored in memory 143a. The processor(s) 141a may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 143a is or includes the main memory of the storage server 140a. The memory 143a represents any form of random access memory (RAM), read-only memory (ROM), flash memory (as discussed below), or the like, or a combination of such devices. In use, the memory 143a may contain, among other things, a set of machine instructions 144a which, when executed by processor 141a, causes the processor 141a to perform operations to implement embodiments of the disclosed technology. In one embodiment, the database management platform 102 contains processor(s) and memory (not shown) similar to the ones of the storage server 140a.

Also connected to the processor(s) 141a through the interconnect 146a are a network adapter 142a and a storage adapter 145a. The network adapter 142a provides the storage server 140a with the ability to communicate with remote devices, such as a database management platform 102, and/or other storage servers 140a over the network 110, and may be, for example, an Ethernet adapter or Fibre Channel adapter. The storage adapter 145a allows the storage server 140a to access the storage units 160a ("160") in a storage organization 150a, and may be, for example, a Fibre Channel adapter, a SCSI adapter, an Ethernet adapter, or any Fibre Channel Protocol (FCP) and iSCSI protocol adapters.

The storage server 140a receives and responds to various read and write requests from one or more clients, e.g., database management platform 102, directed to data stored in or to be stored in the storage organization 150a. The storage organization 150a can be a RAID configuration which provides data redundancy and fault tolerance to the data stored in the storage units 160a. The storage organization 150a contains multiple storage units 160a1-160a10 ("160a") that can include, for example, conventional magnetic or optical disks or tape drives; alternatively, they can include non-volatile solid-state memory, such as flash memory, etc.

In some embodiments, the storage resource available in the various storage units 160a are organized as one or more storage volumes. A storage volume is a logical storage entity providing a logically contiguous portion of storage within the physical storage units 160a. As discussed above, each such storage volume can be assigned to one or more databases which can utilize the assigned storage volume to store their associated data, e.g., data being organized and managed using the database. In some embodiments, the storage server 140a receives and responds to various read and write requests from one or more clients directed to data stored in (or to be stored in) the one or more storage volumes in the storage organization 150a.

In some embodiments, the storage server 140a monitors the performance of data access requests directed to data stored in (or to be stored in) the various storage volumes in the storage organization 150a. The data access requests can include a data read request, a data write request, a data modification request, etc. In some embodiments, the storage server 140a monitors the performance of data access requests at various storage granularity, e.g., performance by storage volume, performance by storage unit, etc. In some embodiments, the monitored performance includes various performance parameters associated with performing the various data access requests directed to data stored in the storage organization 150a.

The various performance parameters associated with performing the various data access requests includes a total time delay associated with servicing a data read request (i.e., the total time elapsed between receiving a request for a data and sending the requested data from the store organization 150a). Other performance parameters include a total time delay associated with servicing a write request, a total time delay associated with servicing a modification request, a total number of a particular data access request performed within a particular time period, etc. In some embodiments, the storage server 140a stores the data gathered from monitoring the various performance parameters in the storage units 160a.

In some embodiments, the storage server 140a computes various performance metrics/statistics based on the gathered performance parameters' data. The generated performance statistics can include a read latency of a storage volume at a particular time computed as a function of the delay associated with servicing a data read access request at the particular time. The generated performance statistics can also include a write latency of the particular storage volume at the particular time measured as a function of a delay associated with servicing a data write access request at the particular time.

Other generated statistics can include an average latency of the particular storage volume at the particular time measured as a function of the generated read latency and write latency at the particular time; the total number of Input/Output ("IO") operations performed within the particular time measured as a function of the total number of read, write, and modification requests performed within the particular time; etc. In embodiments, the storage server 140a provides the gathered performance parameters' data and any generated statistics at various storage granularity in response to a request from a client, e.g., database management platform 102. For instance, the storage server 140a can provide the performance parameters' data of a particular storage volume gathered within a particular time period to the database management platform 102.

In embodiments, the database management platform 102 utilizes an application programming interface (API), for example, Zephyr Application and Programming Interface (ZAPI) protocol, to request the gathered performance data from the storage server 140a. An API is a source code interface that a computer system or program library provides in order to support requests for services to be made of it by a computer program. The ZAPI protocol includes various functions that can be utilized to request specific data from the storage server 140a, e.g., read latency of a particular volume within a particular time period, the latency associated with various read access requests within a particular time period, etc.

In some embodiments, the database management platform 102 includes a performance analysis module 104 to communicate with the various storage servers 140a-140z to gather the performance data. In some embodiments, the performance analysis module 104 can be provided as a plug-in to a database management module 106 used to create and manage databases for managing data for client applications, e.g., financial management systems, payroll applications, customer relationship management systems, etc. The database management module 106 can be any one of database application, e.g., Oracle Enterprise®, DB2®, MySQL®, SQL® Server, etc., which can create and manage databases for managing data for client applications. So, for example, the performance analysis module 104 can be provided as a plug-in to an Oracle Enterprise® database application.

In embodiments, the database management module 106 includes a database instances module 108 to track and manage the various databases created through the database management module 106. In embodiments, the database instances module 108 stores information that maps the various database instances to corresponding storage volumes in the various storage servers 140a-140z used to store data associated with the particular database instance. For example, a database for managing a firm's employees' personal information can store those personal information in one or more storage volumes assigned accessible through the various storage servers 140a-140z.

In some embodiments, the database management module 106 performs the assignment of particular storage volumes for storing data of a particular database and stores the information in the database instances module 108. In some embodiments, a database administrator ("DBA") manually performs the assignment of particular storage volumes for storing data of a particular database and the database management module 106 stores the information in the database instances module 108.

In some embodiments, the DBA performs the assignments by assigning mount points to a particular database, where a mount point is a file system object that provides access to a particular volume. The database instances module 108 stores the mount point assignments for the particular database, which can then be queried to identify the storage volumes in the various storage servers 140a-140z used to store data associated with the particular database.

Turning briefly to FIG. 4, FIG. 4 is a mapping table 400 illustrating the mapping between the various databases 402, the mount points assigned to the databases, the storage volume 408 associated with each of the mount points, and the FQDN address of the managing interface of the storage servers 140a-140z providing access to the various storage volumes 408 associated with the mount points.

As discussed earlier, a particular storage volume can be utilized to store the content of more than one database. In FIG. 4, the storage volume "/vol/vol1" is utilized to store the data of both database "db1" and "db2". In some embodiments, the content in the mapping table 400 can be generated by the performance analysis module 104 by parsing the mount point definitions associated with the each of the database instance in the database instances module 108.

Returning to FIG. 1, in some embodiments, the performance analysis module 104 provides the operation performance for a particular database by gathering the performance data of the various storage volumes (across the storage server 140a-140z) used to store data associated with the particular database. To provide the operation performance for the particular database, in some embodiments, the performance analysis module 104 identifies the storage volumes that are accessible through the various storage servers 140a-140z in the distributed storage environment 100.

In some embodiments, the performance analysis module 104 identifies the storage volumes accessible through the various storage servers 140a-140z by querying each of the storage servers 140a-140z for the list of storage volumes in their storage organizations 150a-150z. In some embodiments, the performance analysis module 104 identifies the subset of storage volumes of the accessible storage volumes which are storing data associated with the particular database.

The performance analysis module 104 identifies the subset of storage volumes using a mapping information that maps the particular database to one or more storage servers providing access to the subset of storage volumes storing data associated with the particular database. The mapping information includes identification information of the specific storage volume of the one or more storage volumes that are accessible through the particular storage server which has been assigned to store data associated with the particular database. As discussed above, in some embodiments, the performance analysis module 104 gathers the mapping information that maps the particular database and its associated storage volumes using mount point definitions that are stored in database instances module 108.

In some embodiments, the performance analysis module 104 gathers the data associated with performance of each storage volume of the subset of storage volumes from the storage server 140a-140z that provides access to the storage volume. As discussed earlier, the storage servers 140a-140z monitor and store data for various performance parameters and performance statistics for the storage volumes (or at other storage granularity) to which they provides access. As discussed above, the performance parameters includes a delay associated with servicing a data read access request, a delay associated with servicing a data write request, a delay associated with servicing a data modification request, the total number of access requests performed within a particular time period, etc. In some embodiments, the performance analysis module 104 gathers the data associated with performance from the storage servers 140a-140z using ZAPI protocol.

In some embodiments, the performance analysis module 104 generates various performance statistics for each of the storage volumes utilizing the gathered performance parameters' data. The generated performance statistics can include a read latency of a storage volume at a particular time computed as a function of the delay associated with servicing a data read access request at the particular time. Further, the generated performance statistics can include a write latency of the particular storage volume at the particular time measured as a function of a delay associated with servicing a data write access request at the particular time. Other generated statistics can include an average latency of the particular storage volume at the particular time measured as a function of the generated read latency and write latency at the particular time.

In some embodiments, the performance analysis module 104 provides the generated statistics as a performance overview of storage volumes associated with the particular database. In some embodiments, the performance analysis module 104 provides the generated statistics in the form of line charts for each particular storage volume. Further, when the database is spanning across multiple storage volumes, the performance analysis module 104 sorts the charts based upon the generated statistics, e.g., average latency, read latency, write latency, etc., and provides a subset of top volumes (or at other storage granularity) by performance. The performance analysis module 104 further provides the various generated statistics in terms of performance of a particular volume, where the performance of each of the database stored in the particular volume is provided as a line chart.

Figure 5:
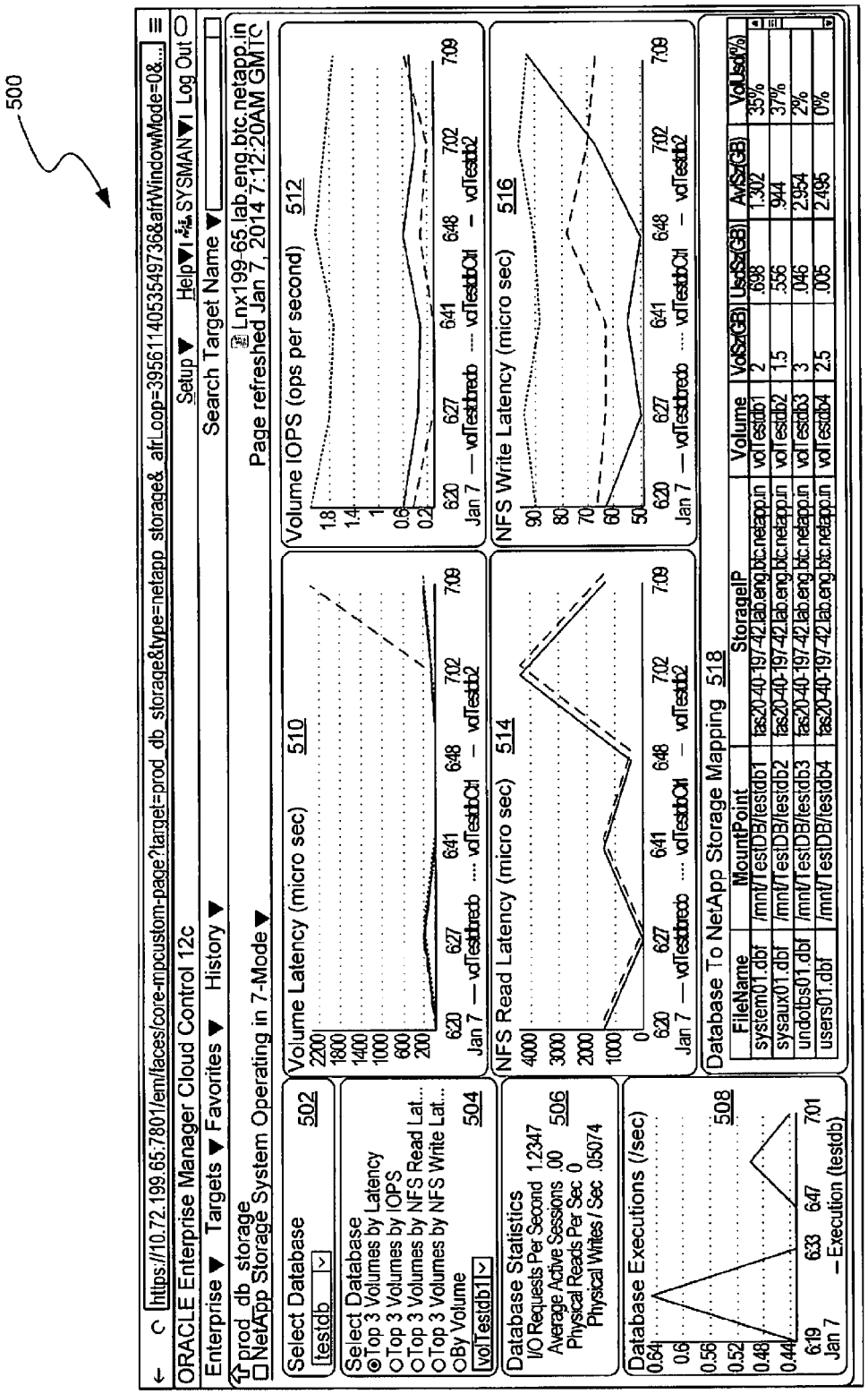
FIG. 5 is a web page providing an illustrative example of the various performance statistics of the storage volumes associated with a particular database which can be viewed/accessed through the a web browser in client.

In some embodiments, the performance analysis module 104 stores the generated statistics and any other gathered statistics from the storage servers 140a-140z in a performance data repository 120. In some instances, the data stored in the performance data repository 120 can be accessed by a client 150 through a web server 130 that provides the various performance statistics as web content. For example, a web page accessible through the web server 130 can be viewed through a web browser executing in the client 150. Turning briefly to FIG. 5, FIG. 5 is a web page 500 providing an illustrative example of the various performance statistics of the storage volumes associated with a particular database which can be viewed/accessed through the a web browser in client 150.

In FIG. 5, the webpage 500 provides a drop-down menu 502 that provides a list of various databases whose data are stored in the storage volumes across the storage servers 140a-140z. By selecting any of the database, the performance of the associated storage volumes can be viewed as line charts. The webpage 500 further allows a user to select the performance views 504 of the various storage volumes associated with the selected database. The webpage 500 further allows a user to select the performance views 504 by storage volumes.

The webpage 500 provides the performance views as line charts for various performance statistics, e.g., average access latency of storage volumes over a particular time period 510, total number of IO operations performed per second by the storage volumes over the particular time period 512, latency of read access requests to storage volumes over the particular time period 514, and latency of write access requests to storage volumes over the particular time period 516.

The webpage 500 further provides the general performance statistics 506 of the selected database, a line chart of the total number of operations 508 performed by the selected database, and a table 518 providing the mapping information that maps the various databases to their associated storage volumes, storage controllers/servers, mount points, and other statistics associated with the usage of associated storage volumes.

Returning to FIG. 1, in some embodiments, the webpage is configured to include various content widgets that utilize the performance statistics stored by the performance analysis module 104 in the content repository 120. In embodiments, the content widgets are configured to refresh the displayed dynamically as the performance analysis module 104 refreshes the performance statistics data stored in the content repository 120.

Figure 2:
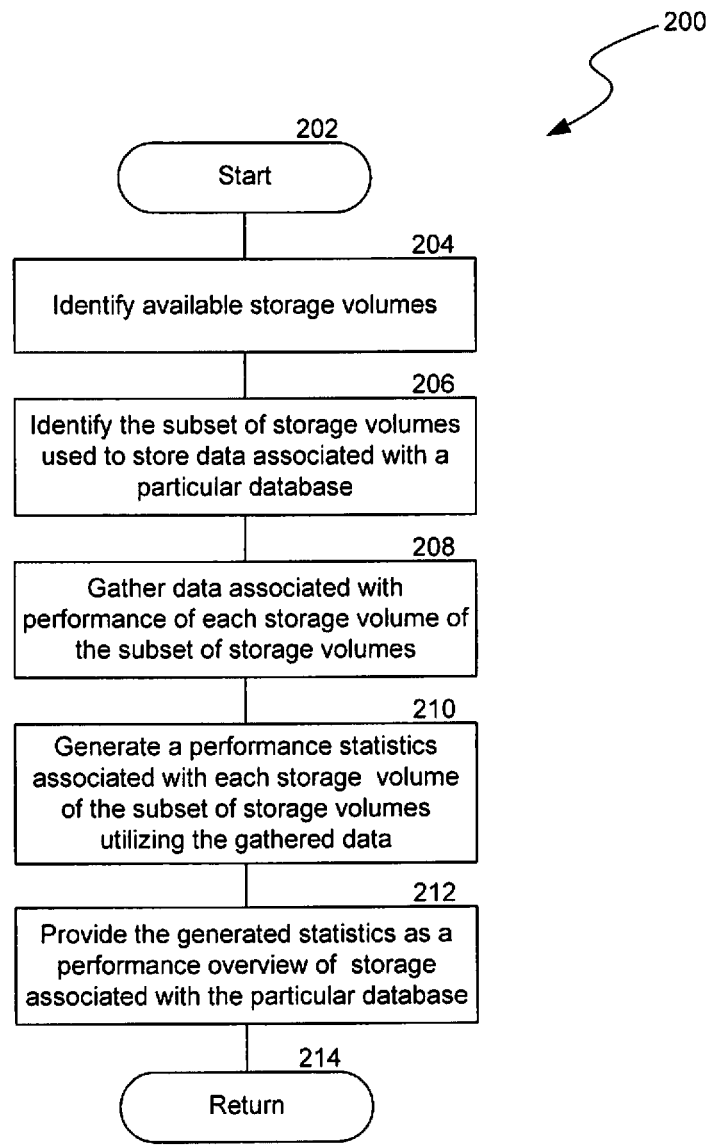
FIG. 2 is a flow diagram illustrating a method for providing a performance overview of storage volumes associated with a particular database.

Turning now to FIG. 2, FIG. 2 is a flow diagram illustrating a method 200 for providing a performance overview of storage volumes associated with a particular database. In various embodiments, the method 200 may be executed in a distributed storage environment, e.g., distributed storage environment 100 of FIG. 1. The method 200 starts at block 202. At block 204, the storage volumes that are accessible through the storage servers of the distributed storage environment are identified, where the storage volumes are utilized to store data associated with one or more databases.

At block 206, a subset of the identified storage volumes which are storing data associated with a particular database are identified. As discussed above, in some embodiments, the identification of the subset of storage volumes is based on a mapping information (e.g., mount point definitions) that maps the particular database to at least one identifier associated with a particular storage server that provides access to the particular storage volume utilized to store data associated with the particular database.

At block 208, data associated with performance of the subset of storage volumes are gathered. At block 210, performance statistics associated with each storage volume of the subset of storage volumes are generated utilizing the gathered data. At block 212, the generated statistics are provided as a performance overview of storage volumes associated with the particular database. The method returns at block 214.

Those skilled in the art will appreciate that the logic illustrated in FIG. 2 and described above, and in each of the flow diagrams discussed below, may be altered in various ways. For example, the order of the logic may be rearranged, substeps may be performed in parallel, illustrated logic may be omitted, other logic may be included, etc.

Figure 3:
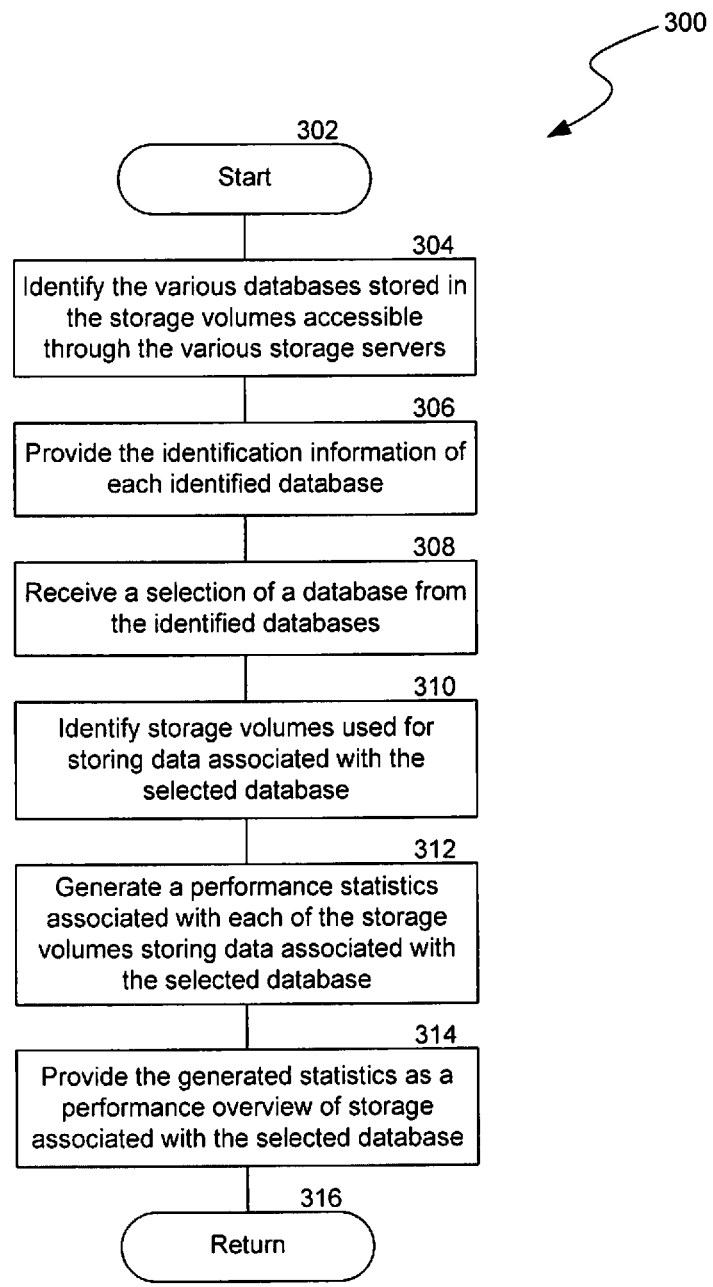
FIG. 3 is a flow diagram illustrating a method for providing a performance overview of storage volumes associated with a particular database.

Turning now to FIG. 3, FIG. 3 is a flow diagram illustrating a method 300 for providing a performance overview of storage volumes associated with a particular database. In various embodiments, the method 300 may be executed in a distributed storage environment, e.g., distributed storage environment 100 of FIG. 1.

The method 300 starts at block 302. At block 304, the various databases whose data are stored in storage volumes using various storage servers in the distributed storage environment 100 are identified. At block 306, the identification information (e.g., a name) corresponding to each of the identified databases are provided. The provided information can enable a user to select the database the needs to be analyzed. At block 308, a selection of a database from the identified databases is received. In some embodiments, the selection can be provided by returning the identification information (e.g., a name) corresponding to the selected databases. At block 310, a subset of the storage volumes storing data associated with the selected database are identified.

As discussed above, in some embodiments, the identification of the subset of storage volumes is based on a mapping information (e.g., mount point definitions) that maps the selected database to at least one identifier associated with a particular storage server that provides access to the particular storage volume utilized to store data associated with the particular database. At block 312, a performance statistics associated with each storage volume of the subset of storage volumes are generated. At block 314, the generated statistics are providing as performance overview of storage associated with the selected database. The method 300 returns at block 316.

Figure 6:
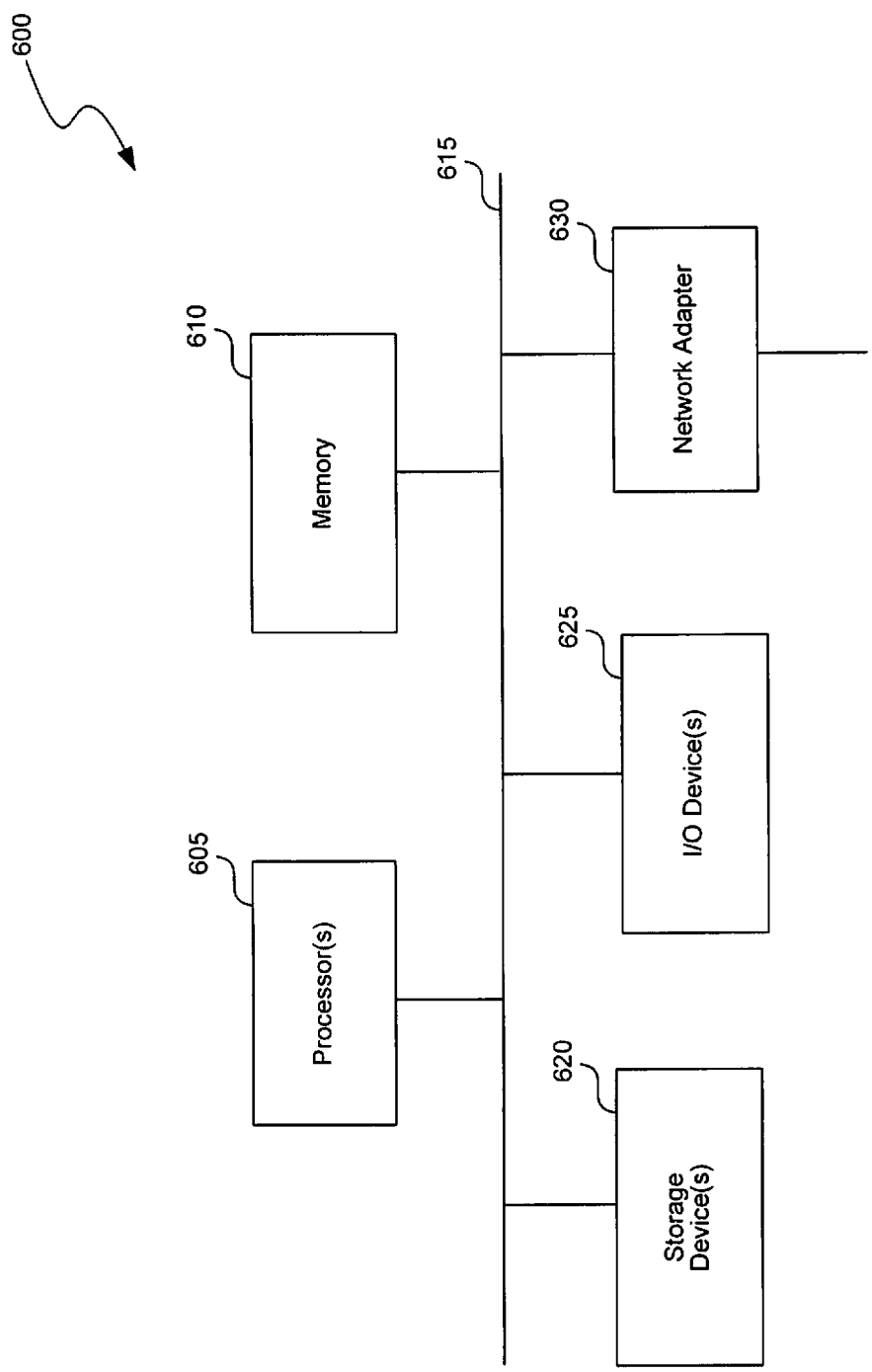
FIG. 6 is a block diagram of a computer system as may be used to implement features of some embodiments of the disclosed technology.

Turing now to FIG. 6, FIG. 6 is a block diagram of a computer system as may be used to implement features of some embodiments of the disclosed technology. The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the technology. Accordingly, the technology is not limited except as defined by the appended claims.

What is claimed is:

1. A computer implemented method, comprising:
identifying multiple storage volumes accessible through multiple storage nodes, the multiple storage volumes being utilized to store data associated with one or more databases and each storage node having access to one or more storage devices used for storing data for the multiple storage volumes;
identifying a subset of storage volumes of the multiple storage volumes storing data associated with a particular database, the identification of a particular storage volume of the subset of storage volumes being based on a mapping between the particular database and at least one identifier of multiple identifiers associated with a particular storage node providing access to the particular storage volume utilized to store data associated with the particular database; wherein the multiple identifiers associated with the particular storage node includes a fully qualified domain name ("FQDN") of each of multiple interfaces associated with the particular storage node, the multiple interfaces including a data interface for managing data at the one or more storage devices and a management interface for exporting services to clients;
gathering data associated with performance of each storage volume of the subset of storage volumes storing data associated with the particular database;
generating performance statistics associated with each storage volume of the subset of storage volumes utilizing the gathered data; and
providing the generated statistics as a performance overview of storage associated with the particular database;
wherein generating the performance statistics associated with each storage volume of the subset of storage volumes utilizing the gathered data further includes:
generating a read latency of the particular storage volume at a particular time as a function of a measured delay associated with servicing a data read access request at the particular time;
generating a write latency of the particular storage volume at the particular time as a function of a measured delay associated with servicing a data write access request at the particular time; and
generating an average latency of the particular storage volume at the particular time as a function of the generated read latency and write latency at the particular time.

2. The method of claim 1, wherein the multiple identifiers associated with a particular storage node includes an internet protocol ("IP") address of each of multiple interfaces associated with the particular storage node, the multiple interfaces including a data interface and a management interface.

3. The method of claim 1, wherein the particular storage volume is a logical storage entity providing a logically contiguous portion of storage within a physical storage device, wherein the physical storage device includes any of a hard disk drive and a flash drive.

4. The method of claim 1, wherein gathering data associated with performance of each storage volume of the subset of storage volumes further comprises:
querying the particular storage node providing access to the particular storage volume for data associated with one or more parameters associated with performance of the particular storage volume, wherein the particular storage node measures and stores the data for the one or more parameters associated with performance of the particular storage volume, wherein querying the particular storage node is performed utilizing a Zephyr Application and Programming Interface (ZAPI) protocol.

5. The method of claim 4, wherein the one or more parameters associated with performance of the particular storage volume includes any of a delay associated with servicing a data read access request, a delay associated with servicing a data write request, a delay associated with servicing a data modification request, a total number of a particular access requests performed within a particular time period, and a total number of all access requests performed within a particular time period.

6. The method of claim 1, wherein the mapping between the particular database and at least one identifier of the multiple identifiers associated with the particular storage node is provided by a mount point definition, the mount point definition being a file system object providing access to the particular storage volume.

7. A computer implemented method, comprising:
identifying multiple databases associated with multiple storage nodes providing access to multiple storage volumes, the association of a particular database to a particular storage node being based on a storage of data associated with the particular database in a particular storage volume accessible through the particular storage node; wherein each storage node has access to one or more storage devices used for storing data for the multiple storage volumes
providing an identification information corresponding to each of the identified multiple databases;
receiving a selection of a database from the identified multiple databases, the selection being based on the provided identification information corresponding to each of the identified multiple databases;
identifying a subset of storage volumes of the multiple storage volumes storing data associated with the selected database, the identification of the particular storage volume of the subset of storage volumes being based on a mapping between the particular database and at least one identifier of multiple identifiers associated with the particular storage node providing access to the particular storage volume utilized to store data associated with the particular database; wherein the multiple identifiers associated with the particular storage node includes a fully qualified domain name ("FQDN") of each of multiple interfaces associated with the particular storage node, the multiple interfaces including a data interface for managing data at the one or more storage devices and a management interface for exporting services to clients;

generating a performance statistics associated with each storage volume of the subset of storage volumes storing data associated with the selected database; and providing the generated statistics as a performance overview of storage associated with the selected database;

wherein generating the performance statistics associated with performance of each storage volume of the subset of storage volumes further comprises:

querying the particular storage node providing access to the particular storage volume for data associated with one or more parameters associated with performance of the particular storage volume, wherein the particular storage node measures and stores the data for the one or more parameters associated with performance of the particular storage volume; and generating the performance statistics associated with particular storage volume of the subset of storage volumes utilizing the queried data; wherein generating the performance statistics associated with each storage volume of the subset of storage volumes utilizing the queried data further includes:

generating a read latency of the particular storage volume at a particular time as a function of a measured delay associated with servicing a data read access request at the particular time;

generating a write latency of the particular storage volume at the particular time as a function of a measured delay associated with servicing a data write access request at the particular time; and generating an average latency of the particular storage volume at the particular time as a function of the generated read latency and write latency at the particular time.

8. The method of claim 7, wherein the multiple identifiers associated with the particular storage node includes an internet protocol ("IP") address of each of multiple interfaces associated with the particular storage node, the multiple interfaces including a data interface and a management interface.

9. The method of claim 7, wherein the particular storage volume is a logical storage entity providing a logically contiguous portion of storage within a physical storage device, wherein the physical storage device includes any of a hard disk drive and a flash drive.

10. The method of claim 7, wherein the one or more parameters associated with performance of the particular storage volume includes any of a delay associated with servicing a data read access request, a delay associated with servicing a data write request, a delay associated with servicing a data modification request, a total number of a particular access requests performed within a particular time period, and a total number of all access requests performed within a particular time period.

11. The method of claim 7, wherein querying the particular storage node is performed utilizing a Zephyr Application and Programming Interface (ZAPI) protocol.

12. A computer readable storage medium storing computer executable instructions, comprising:

instructions for identifying multiple storage volumes accessible through multiple storage nodes, the multiple storage volumes being utilized to store data associated with one or more databases and each storage node having access to one or more storage devices used for storing data for the multiple storage volumes;

instructions for identifying a subset of storage volumes of the multiple storage volumes storing data associated with a particular database, the identification of a particular storage volume of the subset of storage volumes being based on a mapping between the particular database and at least one identifier of multiple identifiers associated with a particular storage node providing access to the particular storage volume utilized to store data associated with the particular database; wherein the multiple identifiers associated with a particular storage node includes a fully qualified domain name ("FQDN") of each of multiple interfaces associated with the particular storage node, the multiple interfaces including a data interface for managing data at the one or more storage devices and a management interface for exporting services to clients;

instructions for gathering data associated with performance of each storage volume of the subset of storage volumes storing data associated with the particular database;

instructions for generating a performance statistics associated with each storage volume of the subset of storage volumes utilizing the gathered data; and instructions for providing the generated statistics as a performance overview of storage associated with the particular database;

wherein generating the performance statistics associated with each storage volume of the subset of storage volumes utilizing the gathered data further includes:

instructions for generating a read latency of the particular storage volume at a particular time as a function of a measured delay associated with servicing a data read access request at the particular time;

instructions for generating a write latency of the particular storage volume at the particular time as a function of a measured delay associated with servicing a data write access request at the particular time; and instructions for generating an average latency of the particular storage volume at the particular time as a function of the generated read latency and write latency at the particular time.

13. The computer readable storage medium of claim 12, wherein the multiple identifiers associated with a particular storage node includes an internet protocol ("IP") address of each of multiple interfaces associated with the particular storage node, the multiple interfaces including a data interface and a management interface.

14. The computer readable storage medium of claim 12, wherein the particular storage volume is a logical storage entity providing a logically contiguous portion of storage within a physical storage device, wherein the physical storage device includes any of a hard disk drive and a flash drive.

15. The computer readable storage medium of claim 12, wherein gathering data associated with performance of each storage volume of the subset of storage volumes further comprises:

instructions for querying the particular storage node providing access to the particular storage volume for data associated with one or more parameters associated with performance of the particular storage volume, wherein the particular storage node measures and stores the data for the one or more parameters associated with performance of the particular storage volume, wherein querying the particular storage node is performed utilizing a Zephyr Application and Programming Interface (ZAPI) protocol.

16. The computer readable storage medium of claim 15, wherein the one or more parameters associated with performance of the particular storage volume includes any of a delay associated with servicing a data read access request, a delay associated with servicing a data write request, a delay associated with servicing a data modification request, a total number of a particular access requests performed within a particular time period, and a total number of all access requests performed within a particular time period.

17. The computer readable storage medium of claim 12, wherein the mapping between the particular database and at least one identifier of the multiple identifiers associated with the particular storage node is provided by a mount point definition, the mount point definition being a file system object providing access to the particular storage volume.

* * * * *